(12) United States Patent
Vestergaard et al.

(10) Patent No.: US 12,304,463 B2
(45) Date of Patent: May 20, 2025

(54) AIRPORT VEHICLE HAVING AN ANTI-COLLISION SYSTEM AND METHOD FOR OPERATING A VEHICLE HAVING AN ANTI-COLLISION SYSTEM

(71) Applicant: Power Stow International ApS, Gadstrup (DK)

(72) Inventors: Martin Vestergaard, Gadstrup (DK); Jonas Gaard Andersen, Gadstrup (DK); Jens Bonde, Gadstrup (DK)

(73) Assignee: Power Stow International ApS, Gadstrup (DK)

( * ) Notice: Subject to any disclaimer, the term of this patent is extended or adjusted under 35 U.S.C. 154(b) by 256 days.

(21) Appl. No.: 17/764,494

(22) PCT Filed: Sep. 29, 2020

(86) PCT No.: PCT/IB2020/059105
§ 371 (c)(1),
(2) Date: Mar. 28, 2022

(87) PCT Pub. No.: WO2021/064573
PCT Pub. Date: Apr. 8, 2021

(65) Prior Publication Data
US 2022/0396260 A1    Dec. 15, 2022

(30) Foreign Application Priority Data
Sep. 30, 2019   (WO) .................. PCT/IB2019/058289

(51) Int. Cl.
*B60W 30/09*   (2012.01)
*B60T 7/22*    (2006.01)
(Continued)

(52) U.S. Cl.
CPC ............... *B60W 30/09* (2013.01); *B60T 7/22* (2013.01); *B60W 10/18* (2013.01); *B60W 50/14* (2013.01);
(Continued)

(58) Field of Classification Search
CPC ...... B60W 30/09; B60W 10/18; B60W 50/14; B60W 2420/408; B60W 2540/12; B60T 7/22; B60T 2201/022; B64F 1/32
See application file for complete search history.

(56) References Cited

U.S. PATENT DOCUMENTS 11,372,611 B2 *  6/2022  Enokida .............. B60R 11/0229
2006/0055520 A1   3/2006  Irvine
(Continued)

FOREIGN PATENT DOCUMENTS

EP   2 581 266 A2     4/2013
EP   3450324 A1 *    3/2019  ................ B60T 7/12
(Continued)

OTHER PUBLICATIONS

International Search Report and Written Opinion from International Application No. PCT/IB2020/059105 dated Dec. 18, 2020.

*Primary Examiner* — Hunter B Lonsberry
*Assistant Examiner* — Harrison Heflin
(74) *Attorney, Agent, or Firm* — GREENBERG TRAURIG, LLP

(57) ABSTRACT

An airport vehicle having an anti-collision system and a method for operating the vehicle, where the vehicle comprises a distance sensor, a 3D sensor system comprising two individual 3D sensors, a brake activation system arranged for activating the braking system of the vehicle, an operator visual indication system, and an anti-collision processing system for controlling the visual indication system as a result of sensed parameters from said distance sensor and
(Continued)

Figure 1:
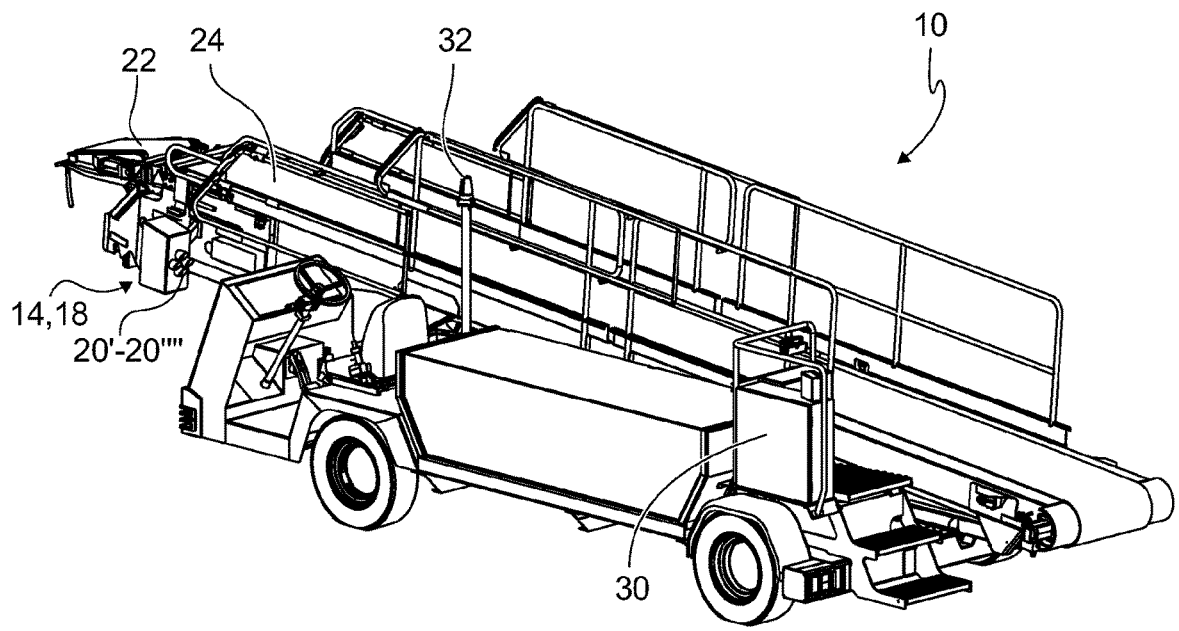

said 3D sensors, and for controlling the brake activation system depending on the sensed parameters, such that when a predefined minimum distance is sensed by the distance sensor, the visual indication system and said brake activation system are activated, and when the 3D sensor senses an aircraft part, the visual indication system and/or said brake activation system is activated, where the brake activation system is arranged.

13 Claims, 3 Drawing Sheets

(51) Int. Cl.
  *B60W 10/18* (2012.01)
  *B60W 50/14* (2020.01)
  *B64F 1/32* (2006.01)
(52) U.S. Cl.
  CPC ............ *B64F 1/32* (2013.01); *B60T 2201/022* (2013.01); *B60W 2420/408* (2024.01); *B60W 2540/12* (2013.01)

(56) References Cited

U.S. PATENT DOCUMENTS

| | | | | |
|---|---|---|---|---|
| 2012/0019375 | A1* | 1/2012 | Kataoka | G08G 1/166 340/439 |
| 2016/0334790 | A1* | 11/2016 | Rust | B60T 13/662 |
| 2017/0301156 | A1* | 10/2017 | Yu | B62D 15/029 |
| 2018/0023951 | A1* | 1/2018 | Seo | B60W 30/12 356/138 |
| 2018/0201312 | A1* | 7/2018 | Smith | B62D 11/08 |
| 2019/0152459 | A1* | 5/2019 | Dieckmann | B60T 13/662 |
| 2020/0298966 | A1* | 9/2020 | Arsenault | B60T 13/665 |
| 2020/0377351 | A1* | 12/2020 | Uchimura | B66F 9/0755 |
| 2021/0309387 | A1* | 10/2021 | Decoux | G05D 1/0251 |

FOREIGN PATENT DOCUMENTS

| | | |
|---|---|---|
| JP | 2006096457 A * | 4/2006 |
| WO | 2014/154860 A1 | 10/2014 |
| WO | 2019/141850 A1 | 7/2019 |
| WO | 2019/155794 A1 | 8/2019 |

* cited by examiner

US 12,304,463 B2

AIRPORT VEHICLE HAVING AN ANTI-COLLISION SYSTEM AND METHOD FOR OPERATING A VEHICLE HAVING AN ANTI-COLLISION SYSTEM

RELATED APPLICATIONS

The present application is a national phase filing under 35 USC 371 of International Application No. PCT/IB2020/059105, filed on Sep. 29, 2020, which claims priority of International Application No. PCT/IB2019/058289, filed on Sep. 30, 2019, the contents of which are incorporated herein in their entirety for all purposes.

TECHNICAL FIELD

The present invention relates to an airport vehicle having an anti-collision system and a method for operating a vehicle having an anti-collision system. More specifically, the present invention relates to a ground support vehicle and a method for preventing ground support vehicles accidently colliding with an aircraft within the airline industry.

BACKGROUND OF THE INVENTION

Within the airline industry, delays of air flights are a major problem, which impacts the passengers, the airport operation and the airline, and which is costly for both the airport and the airline. Such delays may be caused by a number of factors, such as weather, passengers, air traffic restrictions, or technical problems.

Especially, technical problems may result in the aircraft being grounded for a longer period, which is extremely costly for the airline. Therefore, a great number of measures are performed in order to monitor and maintain the working condition of the aircraft, hereby minimising the risks of technical problems.

However, technical problems may also occur unintentionally from ground support personal, or equipment not fulfilling prescribed support standards and procedural operations. A large number of technical problems of the aircraft thus results from human errors of the personal working in ground support, and especially from human errors of the personal working with ground support vehicles, such as loaders, including belt loaders, transporters, such as cargo platforms for loading containers, catering vehicles, etc.

Ground support vehicles comes within close proximity of the parked aircraft, and a slight misjudgement by the vehicle operator may cause an accidental collision between the ground support vehicle with the aircraft.

Especially belt loaders, which are vehicles with lengthy conveyor belts on belt arms/booms for loading and unloading of baggage and cargo onto/from the aircraft, where the conveyor belt needs to be positioned precisely at the door sill of an aircraft hold (baggage compartment) during operation, may cause collisions between the belt arm and aircraft body, when the belt arm is maneuvered into or out of position by the operator. The belt arm must be guided into, and out of a position where the front of belt arm is arranged a predefined distance within the aircraft, such that the luggage and cargo can be loaded/unloaded.

Such maneuvering of the ground support vehicles involves great operator skills and involves a number of ground support personnel assisting in visually guiding the operator toward the aircraft without any collision occurring.

Older prior art systems, such as known belt loaders, comprise in the most basic embodiments some sort of collision bumpers arranged from relatively soft material, such as rubber, and acting as a collision buffer.

Other more recent types of systems arranged for preventing collisions between ground support vehicles and a parked aircraft comprise distance sensors arranged on the ground support vehicle for sensing a distance to the aircraft. When the ground support vehicle approaches the aircraft, the distance is measured by the sensors, and according to a predetermined distance, signalling means such as signalling lamps inside the operators cabin are alerted, such that the operator can slow the vehicle down, or the sensing means are coupled to the drivetrain of the vehicle, hereby reducing the approaching speed. The signalling means are arranged inside the cabin, which makes the operator unable to observe the signalling means and keeping him focused on the approaching towards the aircraft. Such systems are disclosed in e.g. EP2433870.

These systems are however not completely failsafe, as they merely intend to regulate the drivetrain of the vehicle, which is thus still moving when being in close/too close proximity of the aircraft. The known systems regulate the vehicle drivetrain, e.g. by regulating the hydrostatic transmission or regulating gear transmission.

As the known systems only comprise distance sensors, the operator receives no indicative guidance in approaching the vehicle into correct docking position and correct distance in relation to the aircraft, and as only the drivetrain of the vehicle is adjusted, a complete braking of the vehicle cannot be assured.

Further, the known systems are expensive to implement as they are incorporated into the vehicle's drivetrain system, and thus very complicated to retrofit into already used vehicles.

It is an object of the present invention to arrange an anti-collision system in which the immediate stop of the vehicle is assured, independently of the operation of the vehicle drivetrain.

It is further an object of the invention to arrange an anti-collision system which can be easily retrofitted and where the operator receives visual guidance in operating the vehicle into and/or out of loading position.

It is an even further object of the invention to arrange an anti-collision system in which it is possible for the operator to both observe the signalling means and observe the aircraft when the vehicle approaches.

The above objects and advantages, together with numerous other objects and advantages, which will be evident from the description of the present invention, are according to a first aspect of the present invention obtained by:

An airport vehicle having a drivetrain and an anti-collision system for preventing a collision between the vehicle and an aircraft, when the vehicle is approaching the aircraft and part of the vehicle is approaching in close proximity of the aircraft to a luggage/cargo loading/unloading position, the anti-collision system comprising:
- a distance sensor for sensing a distance parameter between a front end of the vehicle and the aircraft;
- a 3D sensor system, comprising two individual 3D sensors, each 3D sensor being arranged for sensing parameters of different parts of the aircraft and/or the vehicle, such as the left and right door side of the aircraft hold door frame and the front end of the vehicle;
- a brake activation system arranged for activating the braking system of the vehicle with a given braking force;
- an operator visual indication system, comprising a number of light indicators for visual indicative guiding a vehicle operator in maneuvering the front end into or out of the loading/unloading position;

an anti-collision processing system for controlling the visual indication system as a result of the sensed parameters from the distance sensor and the 3D sensors, and for controlling the brake activation system, depending on the sensed parameters, such that when a predefined minimum distance is sensed by the distance sensor, the visual indication system and the brake activation system are activated, and when the 3D sensor senses an aircraft part, the visual indication system and/or the brake activation system is activated, and wherein the brake activation system is arranged for controlling the approaching speed by continuously controlling the brake system of the vehicle independently of any controlling and activation of the drivetrain of the vehicle such that an approaching speed of the vehicle is controlled independently of any controlling and activation of the drivetrain by an operator.

The system according to the invention is cost effective to retrofit in a ground support vehicle after manufacture. Due to the arrangement of the brake activation system bypassing the drivetrain of the vehicle, merely all types of ground support vehicles may be retrofitted with the anti-collision system. A skilled operator may thus control only the throttle of the vehicle in approaching the aircraft as the anti-collision system controls the vehicle braking system, whereby operating time is saved.

Compared to the known prior art, which discloses complicated systems that controls the drivetrain of the vehicle and therefore are complicated and costly to retrofit, the present invention is defined by an anti-collision system which, completely independently of any controlling of the drivetrain, is able to control and stop the vehicle in order to avoid any collision.

The airport vehicle may be any type of airport vehicle, including transporters, such as cargo platforms for loading containers, and catering vehicles; but may in a preferred embodiment be a belt loader.

The distance sensor is preferably an ultrasonic sensor that uses a transducer to send and receive ultrasonic impulses that relay back information about the aircraft's proximity, and as such known within the automotive industry, but may include other types of proximity sensors known to the skilled person.

The 3D sensors are preferably arranged as 3D "time-of-flight" sensors (ToF), which is a highly accurate distance mapping and a 3D imaging technology, where depth sensors emit a very short infrared light pulse and each pixel of a camera sensor measures the return time. The 3D sensor (ToF) thus uses infrared light (lasers invisible to the human eye) to determine depth information about the aircraft. The sensor emits a light signal, which hits the aircraft and returns to the sensor. The time it takes the light impulses to bounce back is then measured and provides depth-mapping capabilities. In a preferred embodiment, the 3D sensor comprises such (ToF) sensors where a lower part emits the infrared light pulses and an upper camera sensor receives the bounced back impulses. The emitter and receiver may be arranged as separate elements or as a single unit.

Each sensor is arranged in proximity of the front end of the vehicle for sensing different parts of the aircraft, respectively. In the preferred embodiment, one of the 3D sensors detects the position of the left side of the aircraft hold door frame in relation to the front end of the vehicle, and the other 3D sensor detects the position of the right side of the aircraft hold door frame in relation to the front end of the vehicle.

The anti-collision system is hereby a two-type sensor system combining the capabilities of each sensor type into a single cooperating sensor system.

The operator visual indication system comprises a light indication system having a number of light emitting indicators, such as LEDs, for signalling towards the operator. The visual indication system in a preferred embodiment comprises a number of light emitting indicators suitable for indicating the position of the vehicle, at least in a forward direction, reward direction and both sideward directions, and therefore in the preferred embodiment comprises four light emitting indicators. However, another number of light emitting indicators suitable to display information of the four directions may be used.

The anti-collision processing system is arranged for controlling the visual indication system as a result of the sensed parameters from the distance sensor and the 3D sensors, and for controlling the brake activation system, depending on the sensed parameters. The processing system combines the sensed information from the two independent sources into a signal controlling the brake activation system and the visual indication system.

According to a further embodiment of the first aspect of the invention, the braking system comprises a brake pedal being manually controllable by the operator establishing a manual braking force, the braking system being activated by either the given braking force or the manual braking force, whichever is the largest.

The braking system of the vehicle is arranged such that the eventual braking force for braking the vehicle is defined by the given braking force or the manual braking force, depending one whichever is the largest.

Compared to the known prior art, this has the technical effect that the brake activation system may be overruled by the operator if the manual braking force is larger than the given braking force. The same applies to the manual braking force, which is overruled by the given braking force if the given braking force is higher than the manual braking force. This has the technical advantage that both the operator and the anti-collision system can overrule one another and emergency brake the vehicle if one of the braking forces is not sufficient to stop the vehicle.

According to a further embodiment of the first aspect of the invention, the anti-collision system further comprising a wheel alignment sensing arrangement, having a wheel position sensor, for sensing the directional position of the wheels of the vehicle, the anti-collision processing system being arranged for controlling the brake activation system and the visual indication system based on information from the wheel alignment sensing arrangement, such that the brake activation system is activated when the wheels are not properly aligned with a longitudinal direction of the vehicle.

The anti-collision system in a further preferred embodiment comprises wheel alignment sensor(s) arranged in connection with the front wheels (steering wheels), for sensing the direction of the wheels in relation to the longitudinal direction of the vehicle. When backing the vehicle away from the aircraft it is crucial that the steering wheels are aligned with the longitudinal direction of the vehicle. When the vehicle, e.g.

a belt loader, is used, the front end of the belt arm is extending a distance inside the aircraft hold, and when backing away from the aircraft, the belt arm would swing to either side and collide with the aircraft door frame if the steering wheels are not aligned. If the wheel position sensors detect that the steering wheels are not properly aligned with the longitudinal direction of the vehicle, the brake activation system is activated and the brakes of the vehicle are activated independently of the vehicle drivetrain.

Hereby is secured that any unintentional acting of the vehicle operator does not result in a collision.

According to a further embodiment of the first aspect of the invention, the 3D sensors are arranged on opposite sides of the distance sensor and/or on opposite sides of the front end of the vehicle.

In order for the sensor system to detect 3D information of the aircraft, and especially 3D information of the opening into the aircraft hold, the two 3D sensors are arranged on opposite sides of the vehicle front end. In an embodiment where the vehicle is a belt loader, each 3D sensor is arranged on opposite sides of the front end of the belt arm. Hereby it is possible for the 3D sensor system to detect the position of the left and right side of the aircraft hold door frame.

According to an alternative and preferred embodiment of the first aspect of the invention, one or preferably both of the 3D sensors are arranged a distance from the front end of the vehicle, such as on top of an operator's cabin. One of the 3D sensors is directed towards the front end of the vehicle for primarily sensing the front end, and the other of the 3D sensor is directed ahead of the front end for primarily sensing parameters of different parts of the aircraft.

In the preferred embodiment, the two 3D sensors are arranged proximate the operator's cabin such as on top of the cabin, one for primarily sensing the front end of the vehicle end and the other for primarily sensing parts of the aircraft. Hereby, distance mapping and 3D imaging of both the front end and the aircraft is captured in relation to a known position on the vehicle, at a distance from the front end. In another embodiment, one 3D sensor is arranged on top of the operator's cabin for primarily sensing the front end of the vehicle end, and the other being arranged at the front end for primarily sensing parts of the aircraft.

Arranging the 3D sensors according to the preferred embodiment results in a more precise and comprehensive distance mapping and 3D imaging of both the aircraft and the front end. As the precise position of the 3D sensors on the vehicle is known, both the distance between the aircraft and the front end, and the distance between the front end and the 3D sensors can be measured. Hereby, with a simple technical solution based on as few as two 3D sensors, a comprehensive mapping of the main parts of the vehicle, including the front end of the belt arm, and the aircraft can be made.

According to a further embodiment of the first aspect of the invention, the visual indication system is arranged at the front end of the vehicle and in a line of sight between the vehicle operator and the front end.

In order for the operator of the vehicle to be able to, in a simple and fail-safe manner, to operate the vehicle in approaching the aircraft, such as a belt loader where the front end of the belt arm is to be precisely guided into and out of the opening into the aircraft hold, the visual indication system is arranged at the front end of the vehicle and in a line of sight between the vehicle operator and the front end. Hereby, the operator is able to focus on the maneuvering of the belt arm in relation to the opening of the aircraft hold, and at the same time, as the visual indication system is arranged in line of sight, receive visual guidance from the indication system without losing focus.

According to a further embodiment of the first aspect of the invention, the visual indication system is arranged proximate to one of the 3D sensors.

According to a further embodiment of the first aspect of the invention, the visual indication system comprises a number of indicators for emitting a light pattern towards the operator, which light pattern indicates which way the operator must turn the steering wheels in order for them to be aligned with the vehicle.

Compared to the known prior art, where an operator receives no guidance regarding the operation of the steering wheels, the visual indication system enables the operator to correct the position of the steering wheels in relation to the aircraft, such that the brake activation system is disengaged from or prevented from engaging the braking system based on information from the wheel alignment sensing arrangement.

According to a further embodiment of the first aspect of the invention, the anti-collision processing system is arranged outside an operator's cabin and preferable at a rear end of the vehicle.

The processing system is preferable arranged outside the operator's cabin, and most preferable arranged at a rear end of the vehicle, such that the system is cost effective to retrofit, and arranged distanced from most moving vehicle parts such as the belt arm, hereby making maintenance of the processing system more effective.

According to a further embodiment of the first aspect of the invention, the airport vehicle anti-collision system further comprises a second visual indication system arranged outside the operator's cabin, and arranged for signalling towards surrounding ground personnel the operation status of the anti-collision system, such status as activated, deactivated, and activated brake activation system.

In order for the surroundings of the ground support vehicle to be aware of the operational status of the anti-collision system, the vehicle comprises a second visual indication system preferably arranged above and behind the operator's cabin. Hereby the second visual indication system can signal if the anti-collision system is non-activated, activated, or if a collision between the vehicle and the aircraft has occurred. The different status indications may be signalled by different colours, e.g. the indication means is off if the anti-collision system is off; the colour of the indication means is green if the system is activated, yellow if the operator uses an override button for overriding the brake activation system, and red if a collision has occurred.

According to a further embodiment of the first aspect of the invention, the brake activation system is arranged as a retrofitted brake activation system which is mounted onto the existing brake system of the vehicle.

According to a further embodiment of the first aspect of the invention, the brake activation system is arranged as a brake pedal activation mechanism including a mechanically, hydraulically, pneumatically or electrically activated cylinder, which is arranged between the rear side of the operator's brake pedal and the chassis of the vehicle, such that the retrofitted brake pedal activation mechanism does not interfere with a manual operation of the brake pedal.

The brake activation system is in a most preferred embodiment a retrofitted activation system which is mounted onto the existing brake system of the vehicle. The brake activation system is in a basic embodiment arranged as a brake pedal activation mechanism, such as a cylinder, including a mechanically, hydraulically, pneumatically or electrically activated cylinder, which is arranged e.g. between the rear side of the operator's brake pedal and the chassis of the vehicle. This arrangement has the technical effect that the brake activation and the entire anti-collision system are easy to install in a retrofit process and hereby cost-effective in terms of work labor. Further, vehicles already employed in an airport may thus be arranged with the defined anti-collision system.

The brake activation system may in an alternative embodiment be arranged in parallel with the operator's brake system such that the brake activation system acts directly with the brakes on each steering wheel.

According to a second aspect of the present invention, the above objects and advantages are obtained by:

A method for operating a vehicle having a drivetrain and an anti-collision system comprising the following steps:
providing a vehicle having an anti-collision system according to the invention,
when the vehicle is approaching the aircraft, continuously sensing a distance between the front end of the vehicle and the aircraft with the distance sensor,
when the vehicle is approaching the aircraft, continuously sensing two different aircraft parts, such as the left and right side of the aircraft hold door frame, with said 3D sensor system,
activating the visual indication system when the 3D system senses the two different aircraft parts are outside a predefined position in relation to the front end of the vehicle, and
activating the visual indication system and the brake activating system when the distance sensor senses a minimum distance between the front end of the vehicle and the aircraft, the brake activating system being arranged for controlling the brake system of the vehicle independently of any controlling or activation of the drivetrain of the vehicle.

According to a further embodiment of the second aspect of the invention, the method further comprising the following steps:
providing a vehicle according to the invention,
activating the visual indication system and the brake activating system when the wheel alignment sensing arrangement senses the wheels are not substantially aligned with a longitudinal direction of the vehicle, and
the visual indication system indicating to the operator a direction of maneuvering the wheels into a direction substantially in alignment with the longitudinal direction of the vehicle, before deactivating the brake activating system.

Figure 2:
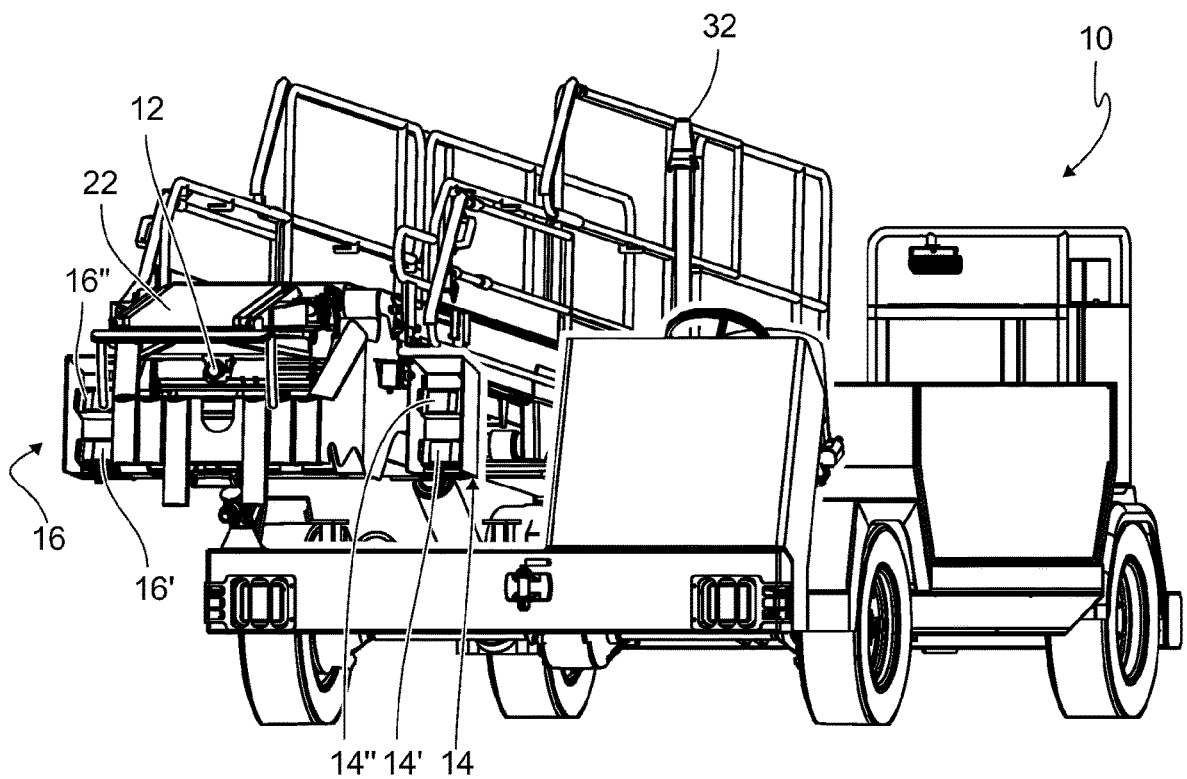
Figure 3:
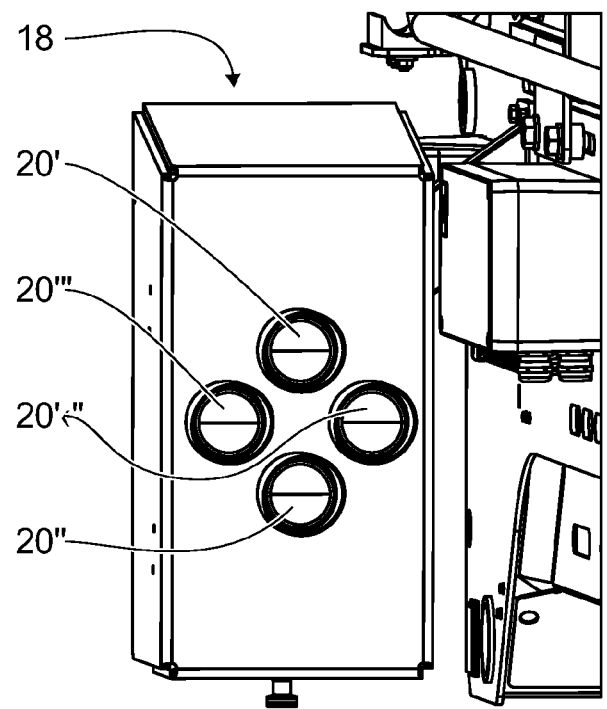
Figure 4:
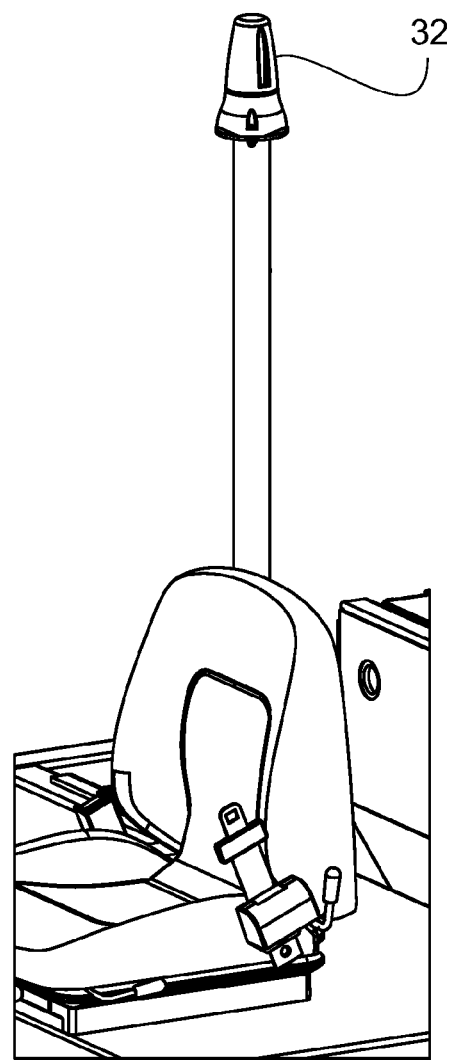
Figure 5:
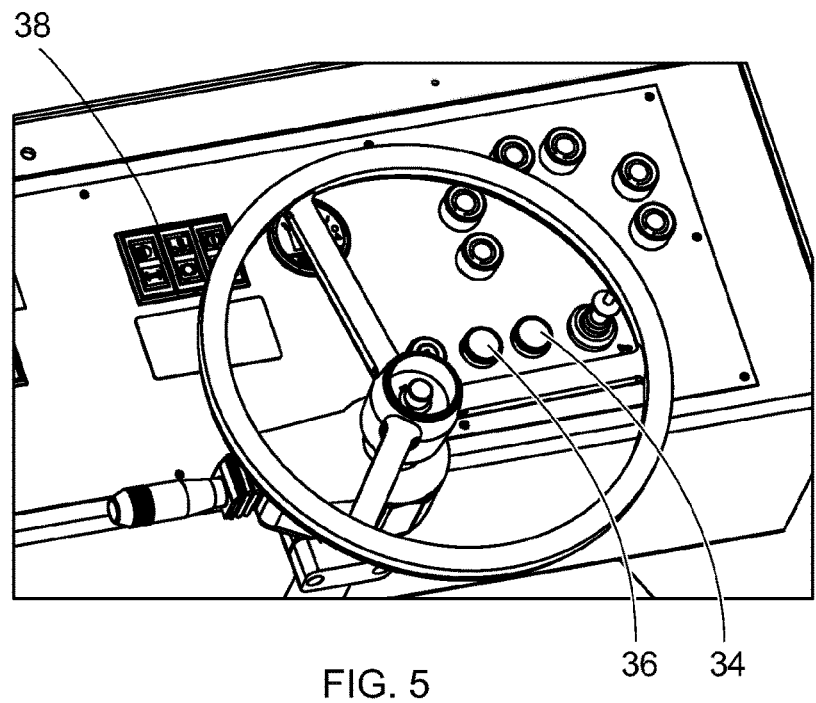
Figure 6:
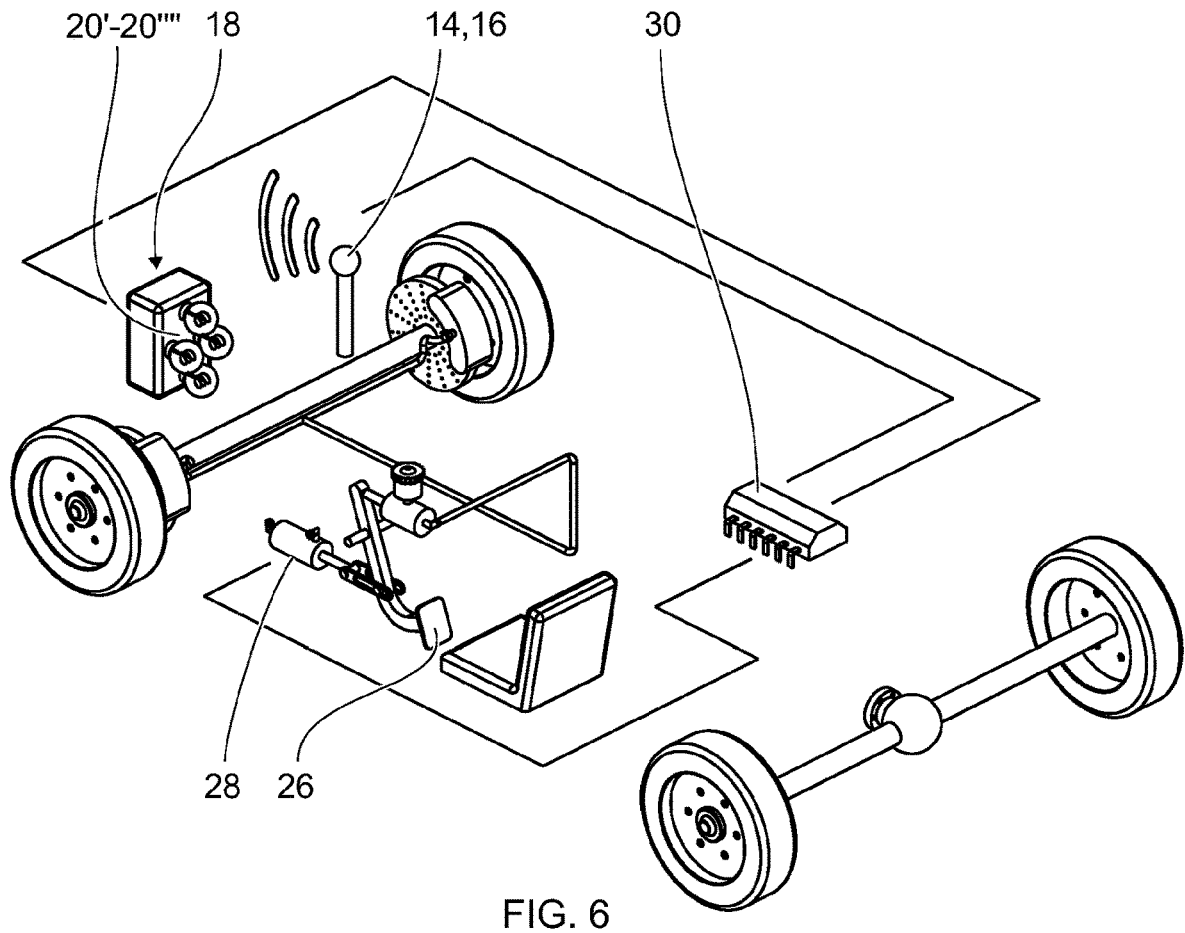

FIG. 1 shows a perspective view of an airport vehicle.
FIG. 2 shows a perspective view of an airport vehicle.
FIG. 3 shows a perspective view of a visual indication system.
FIG. 4 shows a perspective view of a second visual indication system.
FIG. 5 shows a perspective view of part of an operator's cabin.
FIG. 6 shows a perspective view of a principal embodiment of an anti-collision system.

The present invention will now be described more fully hereinafter with reference to the accompanying drawings, in which exemplary embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout. Like elements will thus not be described in detail with respect to the description of each figure.

FIG. 1 shows a perspective view of an airport vehicle 10 having an anti-collision system. The vehicle 10 is illustrated as a typically self-propelled belt loader 10 and will in the following detailed description of the embodiments of the invention be defined as a belt loader 10.

The belt loader 10 is designed to deliver bulk cargo and baggage to the aircraft hold and comprises a longitudinal belt arm 24, also defined as a boom, which is equipped with a main conveyer belt for conveying the cargo and baggage into the aircraft. The belt arm 24 may come in various lengths and may thus vary from a few meters and up to 9-10 meters suitable for reaching higher level aircraft doorsills. A typically belt loader 10 may reach approx. five meters in height.

The belt loader 10 comprises a rear end and a front end 22, which front end 22 in the illustrated embodiment is defined as the most forward part of the belt arm 24. The front end 22 comprises a second belt conveyer for engaging the cargo floor of the aircraft hold and may be pivoted in relation to the larger main conveyer belt.

The belt loader 10 comprises an anti-collision system having a distance sensor (shown in FIG. 2) for measuring the distance between the front end 22 of the belt loader 10 and the aircraft; a 3D sensor system comprising a left 3D sensor 14 and a right 3D sensor 16 (shown in FIG. 2) for sensing the position of the doorsill of the aircraft hold door frame sides in relation to the front end 22 of the belt loader 10. The anti-collision system further comprises a visual indication system 18, which in the illustrated embodiment is arranged in the same housing as the left 3D sensor 14. The left 3D sensor 14 and the visual indication system 18 may however be arranged as separate elements. It is through a preferred embodiment that the visual indication system 18 is arranged in the operator's line of sight and therefore preferable in proximity of the front end 22 of the belt arm and connected thereto.

The visual indication system 18 comprises a number of light emitting indicators 20'-20"", pointing towards the operator for visual guiding the operator in steering the belt loader 10 in response to the sensed parameters of the distance sensor 12 and the 3D sensors 14, 16.

The anti-collision system is controlled by a processing system 30, which processes the received information/parameters from the sensors 12, 14, 16 and compares this information with predefined parameters such as a minimum distance to the aircraft hold and maximum offset of the location of the door frame in relation to the front end 22. The processing system 30 continuously signals the processed information via the visual indication system 18, such that the operator at any time receives visual information from the light emitting indicators 20'-20"". Such visual information may be a green light, when a minimum distance is not present or the front end 22 is in alignment with the opening into the aircraft hold. The visual information may thus be a red light, when a minimum distance is reached and/or if the front end 22 is not properly aligned with the opening into the aircraft hold.

Further, the belt loader is arranged with a brake activation system (see FIG. 6), which in a basic embodiment comprises a brake pedal activation mechanism, such as a cylinder (ref. 28, FIG. 6), including a mechanically, hydraulically, pneumatically or electrically activated cylinder, which is arranged e.g. between that rear side of the operator's brake pedal and the chassis of the belt loader 10. The brake activation system is connected to the processing system 30 and is activated when the above described minimum distance or maximum offset is reached, hereby avoiding any collision between the front end 22 and the aircraft.

The belt loader 10 further comprises a wheel alignment sensing arrangement (not shown) having a wheel position sensor for sensing the directional position of the wheels of the belt loader 10. When backing the belt loader 10 away from the aircraft, it is crucial that the steering wheels are aligned with the longitudinal direction of said belt loader 10; otherwise the front end 22 will swing into the aircraft.

The wheel alignment sensing arrangement is thus connected to the processing system 30, which signals to the visual indication system for visual informing the operator that the wheels are not properly aligned, and if the operator starts backing out without aligning the wheels, the brake activation system is activated and the brakes (brake pedal 26, FIG. 6) of the belt loader 10 are engaged. The brake activation system is incorporated into the vehicle, independent of the drivetrain of the vehicle, whereby the system is cost effective to install in a retrofit process and may be installed in basically any type of ground support vehicle, no matter what type of drivetrain is being used.

In order for the other ground personnel to be aware of the status of the anti-collision system, the belt loader 10 comprises a second visual indication system 32, arranged above and behind the operator, for signalling different colours dependent on the system status, e.g. the second visual indication system 32 is off when the anti-collision system is off; the colour is green when the anti-collision system is activated and no collision has occurred, yellow if the operator uses an override button for overriding the brake activation system, and red when a collision has occurred.

FIG. 2 shows a perspective view of the front end of the belt loader 10. The distance sensor 12 is shown arranged on the most forward part of the front end 22 and in a centre thereof.

The left 3D sensor 14 and the right 3D sensor 16 are shown arranged on opposite sides of the front end 22, and each 3D sensor 14, 16 comprises a lower 3D sensor emitter 14',16', which emits the infrared light pulses, and an upper 3D sensor receiver 14",16", which receives the bounced back infrared light impulses.

FIG. 3 shows a perspective view of the visual indication system 18, which is shown having four light indicators 20'-20"", each indicator being arranged for displaying a number of colours, preferable three colours such as green, yellow and red.

If the anti-collision system is of, all four indicators 20'-20"" are off.

If the anti-collision system is on and all four indicators 20'-20"" are green, the belt loader 10 may proceed to drive.

If one of the indicators 20'-20"" turns yellow, the belt loader is headed towards an obstacle that eventually will come too close in that side of the yellow light. The upper indicator 20' symbolises the front end 22, the left and right indicators 20'", 20"" symbolise the left and right side of the front end 22.

If the operator does not try to get out of the yellow indicator state, the yellow indicator(s) will turn red, and the brake activation system is engaged, whereby the belt loader 10 will stop. For the operator to be able to continue, an override button (ref. 36— FIG. 5) would have to be activated.

When the belt loader has reached a correct docking position, the indicators 20'-20"" will signal a flashing pattern towards the operator.

When the belt loader 10 is being reversed away from the aircraft and if the wheels are aligned, all four indicators will be green. If the wheels are not aligned and the front end 22 is within 2 meters of the aircraft, the brake activation system will be activated and the belt loader 10 will stop. Here, three indicators will turn red and one will turn green, which green indicator light travels around all four indicators 20'-20"" in a circle to indicate which way the operator must turn the steering wheels in order for them to be aligned.

Although specific motion patterns and light colours have been described in relation to the visual indicator system 18, the skilled person would, when being presented to the above description, recognise that any colour and/or light pattern that would give the same effect could be incorporated.

FIG. 4 shows a perspective view of a second visual indication system 32 and clearly illustrates the second visual indication system 32 being arranged above and behind the operator.

FIG. 5 shows a perspective view of part of an operator's cabin. The figure shows the operator's cabin being arranged with a standby button 34, which the operator has to press in order to activate the anti-collision system. The operator's cabin further comprises an override button 36, which has to be pressed if the processing system has activated the brake activation system. It the belt arm is raised, the anti-collision system will activate automatically.

FIG. 6 shows a perspective view of a principal embodiment of an airport vehicle having an anti-collision system. The figure shows a sensor system 14, 16, including the distance sensor 14 and the 3D sensors 16, but is, for the sake of simplicity, illustrated as one single sensor. The figure further shows the visual indication system 18 and the processing system 30 being in parallel connection with sensors 14, 16 and the indicator system 18.

The figure also shows a brake pedal activation mechanism illustrated as a brake cylinder connected to the 28 vehicle brake pedal, and the brake pedal activation mechanism being connected to the processing system. All components of the anti-collision are thus installed into the vehicle independently of any vehicle drivetrain.

In the following is given a list of the reference signs used in the detailed description of the invention and the drawings referred to in the detailed description of the invention.

10 Airport vehicle
12 Distance sensor
14 Left 3D sensor
14' Left 3D sensor emitter
14" Left 3D sensor receiver
16 Right 3D sensor
16' Right 3D sensor emitter
16" Right 3D sensor receiver
18 Visual indication system
20' Upper indicator (Ui)
20" Lower indicator (Li)
20'" Left indicator (Lei)
20"" Right indicator (Ri)
22 Front end
24 Belt arm/boom
26 Brake pedal
28 Brake cylinder
30 Processing system
32 Second visual indication system
34 Standby button
34 Override button
38 Third visual indication system

The invention claimed is:

1. An airport vehicle comprising:
a drivetrain; and
an anti-collision system configured to prevent a collision between the airport vehicle and an aircraft when the airport vehicle is approaching in close proximity of the aircraft to a luggage/cargo loading/unloading position, the anti-collision system comprising:

a distance sensor configured to sense a distance parameter between a front end of the airport vehicle and the aircraft;
a 3D sensor system, comprising two individual 3D sensors,
  wherein each 3D sensor is configured to sense parameters of different parts of at least one of the aircraft or the airport vehicle, including a left door side and a right door side of an aircraft hold door frame and the front end of the airport vehicle;
a brake activation system configured to activate the braking system of the airport vehicle with a given braking force;
an operator visual indication system comprising a number of light indicators configured to provide visual indicative guiding to a vehicle operator in manoeuvring the front end into or out of the loading/unloading position;
an anti-collision processing system configured to:
  control the visual indication system as a result of the sensed parameters from the distance sensor and the 3D sensors, and
  control the brake activation system depending on the sensed parameters such that when a predefined minimum distance is sensed by the distance sensor, the visual indication system and the brake activation system are activated, and when the 3D sensor senses an aircraft part, at least one of the visual indication system or the brake activation system is activated,
  wherein the brake activation system is configured to control an approaching speed of the airport vehicle by continuously controlling the brake system of the airport vehicle independently of any controlling and activation of the drivetrain of the airport vehicle such that an approaching speed of the airport vehicle is controlled independently of any controlling and activation of the drivetrain by the vehicle operator,
  wherein the anti-collision processing system further comprises a wheel alignment sensing arrangement comprising a wheel position sensor configured to sense a directional position of the wheels of the airport vehicle,
    wherein said anti-collision processing system is configured to control the brake activation system and the visual indication system based on information from the wheel alignment sensing arrangement,
    wherein the brake activation system is activated when the wheels are not substantially aligned with a longitudinal direction of the airport vehicle when the vehicle starts backing away from the aircraft and the airport vehicle is within a specific distance from the aircraft, and
  wherein the visual indication system comprises a number of indicators for emitting a light pattern towards the vehicle operator,
    wherein the light pattern indicates which way the vehicle operator must turn steering wheels in order for the steering wheels to be aligned with the airport vehicle.

2. The airport vehicle according to claim 1, the braking system comprising a brake pedal configured to be manually controllable by the operator establishing a manual braking force, the braking system configured to be activated by either of the given braking force or the manual braking force, whichever is greater.

3. The airport vehicle according to claim 1, wherein the visual indication system is arranged at the front end of the airport vehicle and in a line of sight between the vehicle operator and the front end.

4. The airport vehicle according to claim 1, wherein the visual indication system is arranged proximate to one of the 3D sensors.

5. The airport vehicle according to claim 1, wherein the 3D sensors are arranged on at least one of opposite sides of the distance sensor or opposite sides of the front end of the airport vehicle.

6. The airport vehicle according to claim 1, wherein one or both of the 3D sensors are arranged at a distance from the front end of the airport vehicle, on top of an operators cabin, one of the 3D sensors being directed towards the front end of the airport vehicle for primarily sensing the front, and the other of 3D sensor being directed ahead of the front end for primarily sensing parameters of different parts of the aircraft.

7. The airport vehicle according to claim 1, wherein the anti-collision processing system is arranged outside an operator's cabin and at a rear end of the airport vehicle.

8. The airport vehicle according to claim 1, wherein the airport vehicle is a belt loader having a belt arm, the distance sensor being arranged at a front end of the belt arm, and the 3D sensors being arranged at the front end of the belt arm and on opposite sides thereof.

9. The airport vehicle according to claim 1, further comprising a second visual indication system arranged outside an operator's cabin, and being arranged for signaling towards surrounding ground personnel an operation status of the anti-collision system, a status as activated, deactivated, and activated brake activation system.

10. The airport vehicle according to claim 1, wherein the brake activation system is arranged as a retrofitted brake activation system which is mounted onto an existing brake system of the airport vehicle.

11. The airport vehicle according to claim 10, wherein the brake activation system is arranged as a brake pedal activation mechanism including a mechanically, hydraulically, pneumatically, or electrically activated cylinder, which is arranged between a rear side of an operator's brake pedal and a chassis of the airport vehicle, to provide a retrofitted brake pedal activation mechanism, such that the retrofitted brake pedal activation mechanism does not interfere with a manual operation of the brake pedal.

12. A method for operating an airport vehicle having a drivetrain and an anti-collision system comprising:
  providing the airport vehicle according to claim 1,
  when the airport vehicle is approaching the aircraft, continuously sensing a distance between the front end of the airport vehicle and the aircraft with the distance sensor,
  when the airport vehicle is approaching said aircraft, continuously sensing two different aircraft parts including the left and right side of the aircraft hold door frame with the 3D sensor system,
  activating the visual indication system when the 3D sensor system senses the two different aircraft parts being outside a predefined position in relation to the front end of the vehicle, and
  activating the said indication system and the brake activating system when the distance sensor senses a minimum distance between the front end of the vehicle and the aircraft, the brake activating system being arranged for controlling the approaching speed by continuously controlling the brake system of the airport vehicle independently of any controlling and activation of the drivetrain of the airport vehicle such that an approaching speed of the airport vehicle is controlled independently of any controlling of the drivetrain by an operator.

13. A method for operating the airport vehicle according to claim 12, the method comprising, activating the visual indication system and the brake activating system when the wheel alignment sensing arrangement senses that the wheels are not substantially aligned with a longitudinal direction of the airport vehicle, and the visual indication system indicating to the operator a direction of manoeuvring the wheels into a direction substantially in alignment with the longitudinal direction of the airport vehicle, before deactivating the brake activating system.

* * * * *